Sept. 16, 1941.    H. B. PORTER ET AL    2,255,808
DEVICE FOR LAYING DOWN OR MEASURING ANGULAR VALUES
Filed Aug. 31, 1939
*Fig.1.*
*Fig.2.*
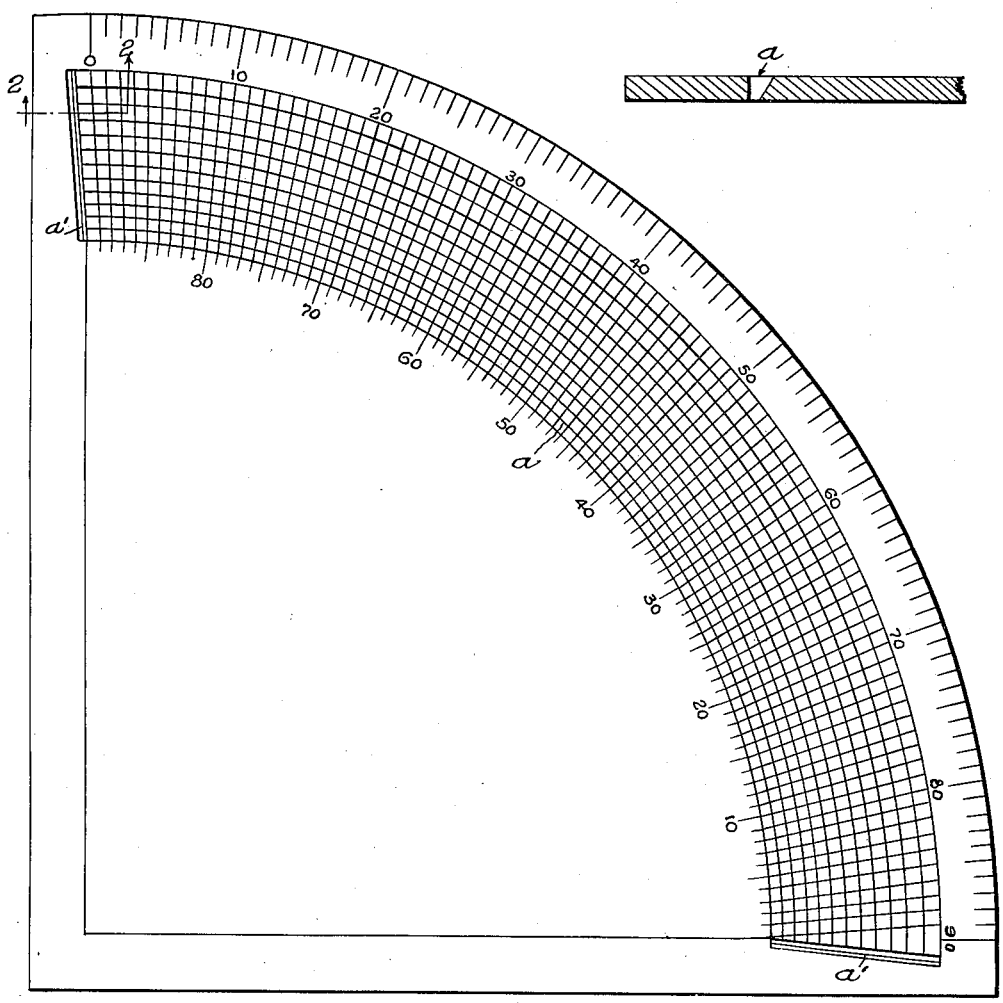
Inventors
Harry B. Porter
Stewart F. Fahringer
By Francis H. Vanderwerker
Attorney Patented Sept. 16, 1941

REISSUED

JAN 1943

2,255,808

UNITED STATES PATENT OFFICE 2,255,808

DEVICE FOR LAYING DOWN OR MEASURING ANGULAR VALUES

Harry B. Porter and Stewart F. Fahringer, Huntington, W. Va.

Application August 31, 1939, Serial No. 292,866

2 Claims. (Cl. 33—1)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to a device which expedites and renders easy and convenient the laying down and measuring of angular values, expressed in the unit of angular measure employed, and has for its principal object to provide means whereby small subdivisions of units of angular measure may be accurately laid down or measured easily and conveniently.

Another important object of the invention is to provide a device whereby small subdivisions of units of angular measure may be accurately laid down or measured without resorting to the use of movable parts.

A further important object of the invention is to provide a device whereby small subdivisions of units of angular measure may be accurately laid down or measured and which is capable of withstanding rough handling and which, because of its simplicity of construction, is relatively inexpensive to manufacture.

With the above and other objects in view, the invention resides in certain novel features of construction and design, the essential features of which are hereinafter pointed out and more fully described and claimed.

In the drawing:

Fig. 1 represents the improvements as applied to a protractor covering an arc of ninety (90) degrees and using the degree as a unit of angular measure; and Fig. 2 is a vertical section taken on the line 2—2 of Fig. 1 and illustrating the formation of the radially extending slots disposed at the extremities of the vernier.

In the illustrated embodiment characterizing this invention, there is shown a conventional 90° protractor provided with a device which hereinafter for descriptive purposes will be referred to as vernier "a" and slot "a'". The vernier a consists of a set of concentric circular arcs, with straight lines crossing them obliquely at a slight angle, so that their intersections furnish smaller subdivisions of the unit of angular measure (the degree, in this case) than can be conveniently marked on the ordinary protractor scale. The radii of the concentric arcs are so computed that the intersections of the oblique lines and the arcs occur at points which divide the one (1) degree divisions into five (5) minute subdivisions. Hence the vernier may be read directly to five (5) minutes of arc. "Straight-line" interpolation is made between the five (5) minute intersections.

The vernier, as shown in Fig. 1, covers a full quadrant of ninety (90) degrees plus an extra degree at the zero (0) and ninety (90) degree extremities. It is the intention to employ such vernier, or part or parts thereof as may be necessary, on protractors covering a full circle or any portion thereof.

The slot a' consists of a bevel edged opening arranged as shown in Figs. 1 and 2 of the drawing. The beveled edge of slot a' crosses the concentric circular arcs obliquely and at the same angle relative to one of the radii of the protractor as the angle between a secant and a radius drawn to the same degree graduation, thus furnishing fractions of a degree in minutes since the radii of the concentric arcs are computed so that the intersections of the beveled edge of the slot a' and the arcs occur at points which divide the one degree divisions of the protractor into five minute subdivisions. In addition to providing fractions of a degree in minutes slot a' also permits the insertion of a sharp pointed pencil or steel prick-point to facilitate plotting. One such slot is shown as being located at the zero (0) and ninety (90) degree extremities of the vernier; however, it is the intention to locate such slot or slots, as may be necessary, at practical convenient positions on protractors covering a full circle or any portion thereof.

Protractors covering arcs of ninety (90) and one hundred eighty (180) degrees shall be constructed so that the straight sides or side of the protractor are made parallel to the 0°—90° and 0°—180° lines respectively. This facilitates the laying down and measuring of bearings when used with a straightedge or drafting triangle.

INSTRUCTIONS FOR USE OF VERNIER AND SLOT

Case I.—To lay off an angle in a clockwise direction from a given base-line (assumed value of angle to be plotted: 10°—15')

Place the protractor over the base-line with the center point (the intersection of the 0° and 90° lines) over the point which is to be the vertex of the desired angle in such a way that the baseline passes through the 10° mark of the inside or counterclockwise degree scale. Insert a sharp-pointed pencil or steel prick-point in the slot on the right-hand side and locate a point three spaces from the end of the slot nearest the center of the protractor and along the beveled edge of the slot. To lay off an angle in a counter-clockwise direction from a base-line, proceed as just described except use the outside, or clockwise degree scale and the slot on the left-hand side of the protractor.

*Case II.—To determine the value of an angle (assumed value of angle to be measured: 23°—45')*

Place the protractor, with the center point over the vertex of the angle to be determined, in such a way that the 0° line coincides with one of the sides of the angle and the other side passes through the vernier. Assuming the outside, or clockwise degree scale is used, the side of the angle will intersect the degree scale between 23° and 24° and will intersect the oblique line of the vernier 9 spaces from the outside arc of the vernier at the 45 minute arc. If the inside or counter-clockwise degree scale is used, the intersection of the side of the angle with the oblique line will be 9 spaces from the inside arc of the vernier.

*Case III.—To determine the bearing of a line*

Place the 0° line of the protractor over the line whose bearing is to be determined and, with the aid of a straightedge, move the protractor to a position such that the center point falls on a N—S grid line and the grid line passes through the vernier. Read the bearing as described under Case II.

*Case IV.—To draw a line with a given bearing through a given point*

Place the protractor in a position such that the N—S grid line passes through the center point and intersects the vernier to read the angle desired. Move the protractor along a straightedge to a position such that when a pencil line is drawn along the straight side of the protractor, it will pass through the given point. Draw the line.

It is apparent that changes in the details of construction and, in the arrangement of the vernier and slot may be resorted to without departing from the spirit intended or scope of the invention as hereinafter claimed, or sacrificing any of its advantages.

In conclusion it will be apparent that this invention, without resorting to moving parts provides a protractor and vernier which will enable a unit of angular measure to be divided into smaller units with a greater degree of accuracy than would be afforded by a protractor of the ordinary type. Likewise this invention furnishes a device which may be used advantageously for checking bearings or angles previously plotted and for plotting a small number of bearings or angles without taking the time which otherwise would be required to set up or orient a drafting machine.

Having thus described our invention, what we claim to be new is:

1. A device for measuring and laying off units of angular measurement, comprising a substantially transparent protractor, including an arcuate edge graduated in one degree divisions of angular measure, a fixed vernier in connection with the protractor and coacting with the graduations on its arcuate edge, said vernier including means for providing in effect a vernier adjustment with respect to each of said degree divisions, whereby to afford fractions thereof in minutes, said means comprising a slot formed in the protractor adjacent one extremity of its arcuate edge, one side of said slot extending obliquely and at a definite angle relative to one of the radii of the protractor, and being graduated to indicate fractions of a degree in minutes.

2. A device for measuring and laying off units of angular measure, comprising a substantially transparent protractor including an arcuate edge graduated in one degree divisions of angular measure, a fixed vernier in connection with the protractor and coacting with the graduations on its arcuate edge, said vernier including inner, outer and intermediate concentric circular arcs, a plurality of secants, intercepting the arcs and extending from the degree graduations on the outer arc to the next degree graduation on the inner arc, the radii of said circular arcs being computed so that the intersections of the secants with the arcs occur at points affording fractions of each of said degrees in minutes and additional means for facilitating plotting the degree fractions, said means comprising a slot formed in the protractor adjacent one extremity of its arcuate edge, one side of said slot extending obliquely and at the same angle relative to one of the radii of the protractor, as the angle between a secant and a radius drawn to the same degree graduation, said side being graduated to indicate fractions of a degree in minutes.

HARRY B. PORTER.
STEWART F. FAHRINGER.